March 25, 1958  J. M. PATTERSON  2,828,158
APPARATUS FOR DISTRIBUTING AGRICULTURAL CHEMICALS
Filed March 13, 1956  2 Sheets-Sheet 1
FIG_1
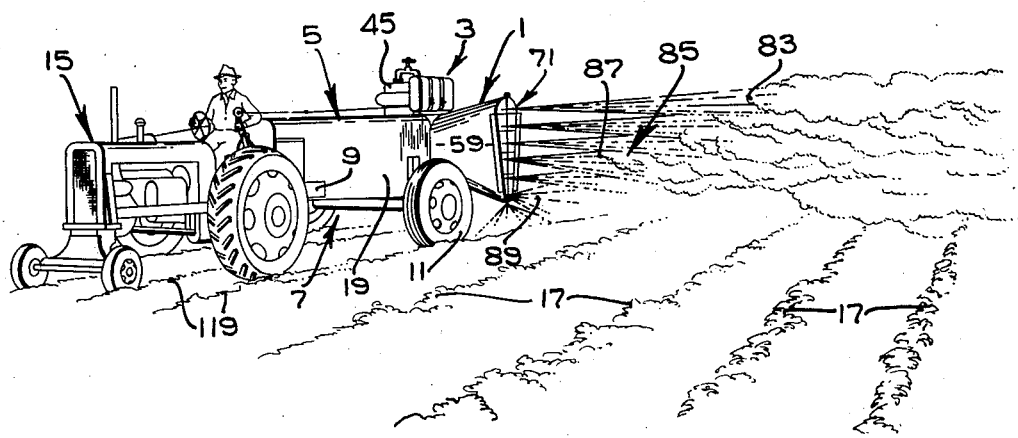
FIG_2
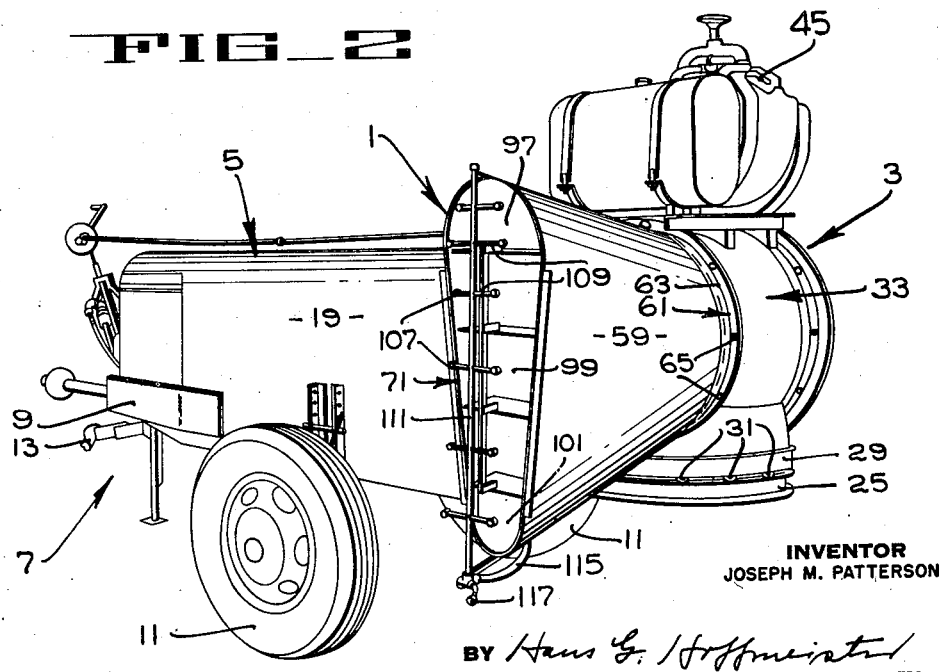
INVENTOR
JOSEPH M. PATTERSON
BY Hans G. Hoffmeister
ATTORNEY March 25, 1958  J. M. PATTERSON  2,828,158
APPARATUS FOR DISTRIBUTING AGRICULTURAL CHEMICALS
Filed March 13, 1956  2 Sheets-Sheet 2
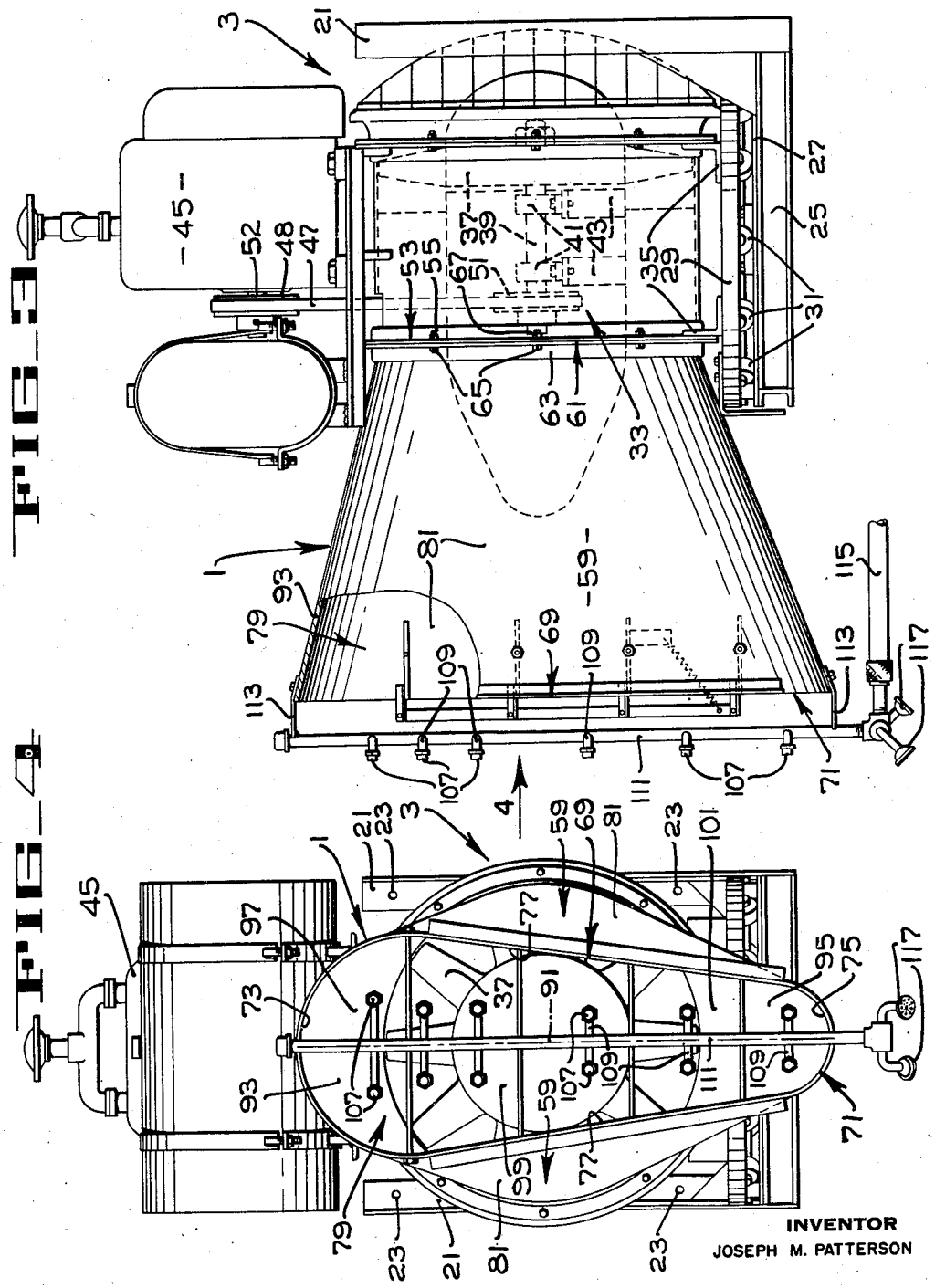
INVENTOR
JOSEPH M. PATTERSON
BY Hans G. Hoffmeister
ATTORNEY

2,828,158

Patented Mar. 25, 1958

2,828,158

APPARATUS FOR DISTRIBUTING AGRICULTURAL CHEMICALS

Joseph M. Patterson, Lansing, Mich., assignor to Food Machinery and Chemical Corporation, San Jose, Calif., a corporation of Delaware Application March 13, 1956, Serial No. 571,219

7 Claims. (Cl. 299—29)

This invention relates to spraying and dusting apparatus and more particularly to apparatus for distributing fluid or flowable material.

An object of this invention is to provide an improved apparatus for distributing a fluid or flowable material.

Another object is to provide an improved design of outlet, or discharge orifice for a spraying or dusting machine, whereby both wide and even distribution of fluid jetted from the orifice is attained.

Another object of the invention is to provide an improved air outlet for a spraying or dusting machine of the type that develops a blast of air into which insecticide of either liquid or powdered form is fed to be distributed by the air blast.

Another object is to provide an improved outlet for air or other fluid handling apparatus, which outlet adapts the apparatus for the performance of a special service by imparting a particular pattern to the jet of fluid issuing from the outlet.

These and other objects and advantages of the invention will become apparent from the following description and the drawings, in which:

Fig. 1 is a perspective illustrating the manner of use of an agricultural spraying machine embodying the present invention, Fig. 2 is an enlarged perspective of the spraying machine of Fig. 1, Fig. 3 is a side elevation partly broken away, of the air blast creating apparatus of Figs. 1 and 2, and Fig. 4 is an end elevation of the apparatus of Fig. 3, viewed in the direction of arrow 4 of that figure.

The present invention contemplates the provision of an air discharge outlet of novel design and indicated by the reference numeral 1 throughout the drawings, wherein the outlet is illustrated as a part of an attachment 3 for converting an ambulatory high pressure liquid spray rig 5 into a machine for applying spray to plants or other articles by means of a blast of air in which the sprayed material is entrained. The spray rig 4 comprises a trailer 7 having a frame 9 (Fig. 2) mounted on wheels 11 and having a tongue 13 by which the trailer 7 can be hitched to a tractor 15 for the purpose of drawing the trailer 7 across a field wherein plants 17 to be sprayed are growing. The high pressure rig 5 is equipped with a tank, engine and pump, all of which are concealed beneath a cover 19 and which function to deliver liquid spray material under pressure to a manifold feed line (not shown) to which either suitable hose lines or spray booms can be attached when the rig 5 is to be used for the purpose of pressure spraying.

The attachment 3 is adapted to be mounted upon the rear end of the trailer 7 by means of upright frame members 21 (Figs. 3 and 4) having a plurality of bolt holes 23 through which bolts can be extended to secure the upright frame members 21 to the rear end of the trailer 7. Horizontal frame members 25 rigid with and extending rearward from the lower ends of the vertical frame members 21 carry a circular platform 27 upon which a turntable 29 is supported for rotation about a vertical axis by means of a plurality of rollers 31 journaled at spaced intervals about the periphery of the turntable 29. An axial kingpin (not shown) connects the turntable 29 to the platform 27 to prevent displacement of the turntable. A blower housing 33 of circular cross section is rigidly mounted by a plurality of brackets 35 upon the turntable 29 in position with the axis of the tubular housing extending diametrically with relation to the turntable so that the housing 33 is disposed in a horizontal position.

An axial flow fan 37 is mounted within the housing 33 by means of a drive shaft 39 disposed axially of the housing 33 and journaled by axially aligned bearings 41 supported upon upstanding frame members 43. The fan 37 is adapted to be rotated from a motor 45 mounted upon the blower housing 33. A V-belt 47 trained around pulleys 48 and 51 on the motor crank shaft 52 and drive shaft 39, respectively, transmits power from the motor 45 to the fan 37. Thus, when the motor 45 is operated, the fan 37 is caused to create a blast of air through the tubular fan housing 33 that issues from the housing at the discharge end 53 of the same. The discharge end 53 of the fan housing 33 is of circular cross sectional form and is reinforced by an angle iron rim 55. The discharge outlet 1 of the present invention is secured to the discharge end 53 of the blower housing 33 to receive the air blast therefrom and to transform the same into a pattern of particular design.

The air outlet or discharge nozzle 1 is in the form of a tubular, sheet metal housing 59 reinforced at its inlet end 61 by a rim 63. The discharge nozzle 1 is mounted upon the blower housing 33 in coaxial alignment therewith by means of a plurality of bolts 65 extending through the radially extending flanges of the rims 55 and 63, and nuts 67 threaded onto the bolts 65.

Whereas the inlet end 61 of the discharge nozzle 1 is of circular cross sectional configuration, the outlet end 69 is somewhat egg-shaped, as clearly shown in Fig. 4. Thus, the discharge nozzle 1 constitutes a horizontally disposed tubular transition member defining at its outlet end a discharge orifice 71 which in vertical cross sectional configuration is arcuate at both its upper and lower edges 73 and 75, respectively. The upper edge 73 of the orifice 71 is arcuate through slightly more than 180° and its curvature is about a radius somewhat longer than that of the curvature of the lower edge 75, which is arcuate through slightly less than 180°. Accordingly, the straight lateral edges 77 of the orifice 71 incline downward and inward toward each other, so that the width of the orifice 71, measured horizontally, decreases toward the lower portion of the orifice.

Even at its widest portion, measured horizontally, the orifice 71 is considerably narrower than the inlet end 61 of the nozzle 1. Accordingly, the side walls 81 (Fig. 3) of the passage 79 through the housing 59 incline inward toward each other and toward the outlet end 69 of the nozzle. Thus, the passage 79 tapers in the direction of flow therethrough so that the over-all effect of the nozzle upon the blast of air passing therethrough is to accelerate the same and thereby increase its penetrating power, i. e., increasing the distance through which the air will move before losing so much velocity that solid or liquid particles entrained therein will drop out of the air jet. However, the housing 59, and particularly its discharge orifice 71, are so contoured that only the upper portion 83 of the jet 85 of air ejected therefrom (Fig. 1) issues at such velocity, while the intermediate portion 87 is characterized by a lower velocity and the lowest portion 89 of the jet 85 issues from the nozzle 1 at the lowest velocity. Therefore, even though the jet 85 is capable of carrying insecticide or other chemicals entrained therein to a relatively great distance, the respective velocities of jet portions 87 and 89, which follow lower trajectories than the high velocity upper portion 83, and therefore are directed toward areas of the ground closer to the nozzle 1, are not so great as to be apt to disturb the soil or injure plants within their respective target areas.

Moreover, the three jet portions 83, 87 and 89 contain successively lesser volumes of air, thus making for relatively even distribution of chemicals entrained within the jet, by compensating for the tendency of a jet portion that is carried to a greater distance to be disseminated over a wider area.

The vertical extent of the orifice 71 measured along its greatest vertical axis 91 (Fig. 4) is approximately two and one half times the maximum horizontal width of the orifice; in fact, the vertical height of the orifice 71 is considerably greater than the diameter of the circular inlet end 61 of the nozzle 1. Accordingly, the top and bottom walls 93 and 95, respectively, of the passage 79 flare, i. e., incline away from each other in the direction of flow through the passage (Figs. 3 and 4). It is to be observed, however, that the pitch, or angle with the horizontal, of the top wall 93 is less than that of the bottom wall 95. Because of the relatively gentle slope of the top wall 93, almost the entire area of the upper portion 97 of the orifice 71 (Fig. 4) is directly opposite the inlet end 61 of the nozzle 1 and therefore receives the full benefit of the propulsive effect of the fan 37, which thus forces a maximum volume of air through the upper portion 97 of the orifice 71 at maximum velocity.

The intermediate portion 99 of the orifice 71 is likewise directly opposite the inlet end 61 of the nozzle 1, and accordingly, it, also, is exposed to the full force of the air stream propelled by the fan 37. However, due to the greater restricting effect of the intermediate portions of the side walls 81 as compared with the upper portions of the same, a lesser unit volume (i. e., volume of air per square inch of orifice area) issues from the intermediate portion 99 of the orifice 71. In accordance with common engineering principles, this decreased volume might logically be expected to be accompanied by a proportionate increase in velocity. However, the lowest part 101 of the orifice 71 is completely out of line with the inlet end 61 of the nozzle 1, since the bottom wall 95 of the passage 79 slopes downward at a greater angle with the horizontal than that of the upward slope of the top wall 93 of the passage. Therefore, the only air that passes through the lowest part 101 of the orifice is that which might be considered as being bled off from the portion of the air blast that otherwise would be forced through the intermediate portion 99 of the orifice 71. Of course, such "bleeding off" not only further reduces the volume of air that must pass through the intermediate portion 99 of the orifice 71, but it also relieves the pressure of the air therein, and thus effects a corresponding reduction in the velocity of air flow through the intermediate portion 99 of the orifice 71.

Since the only part of the air stream that passes through the lowest portion 101 of the orifice 71 is that which escapes laterally from the part of the air stream that the fan 37 originally projects toward the intermediate portion 99 of the orifice, not only the pressure, and consequently the velocity, but also the volume of the air passing through the lowest portion 101 of the orifice, are lower than the corresponding characteristics of the other portions of the air stream.

In order to introduce spray material into the air stream, a group of sprayer heads 107 are mounted on the nozzle 1 in position to lie within the air stream issuing from the orifice 71. These spray heads 107 are carried by tubes 109 extending laterally from a manifold tube 111 supported from the nozzle housing 59 by brackets 113. The lower end of the manifold tube 111 is adapted to be connected by a flexible tube 115 (Fig. 3) to the hereinbefore mentioned manifold feed line (not shown) of the high pressure spray rig 5 upon which the air sprayer attachment 3 is mounted. Thus, liquid spray material under pressure can be supplied to the spray heads 107 from the tank and pump (not shown) of the pressure rig 5, to be sprayed by the heads 107 directly into the various parts 83, 87 and 89 of the jet 85 of air as they issue from the orifice 71.

The spray heads 107 are more closely grouped at the upper portion 97 of the orifice 71, so as to deliver a greater quantity of liquid spray material to the upper portion 83 of the jet 85. This tends to compensate for the greater volume of air within the upper portion 83 of the jet as well as for the wider area over which the upper portion 83 of the jet distributes spray material entrained therein, and thus makes for uniform application of the spray material over the entire target area at which the jet 85 is aimed.

Supplementary spray heads 117 may be carried by and connected to the manifold tube 111 in position to direct their spray downward independently of the air jet 85, thus to apply spray material to plants 119 (Fig. 1) over which the equipment passes, and which, therefore, are not within range of the jet 85 when the equipment is operated with the attachment 3 directing the chemical-laden air jet 85 laterally, as illustrated in Fig. 1.

This is the usual manner of operation of the spraying apparatus of the present invention. The direction of advance of the equipment should be parallel to the row of plants 17 to be sprayed, for ease of maneuvering the equipment without injury to the plants. When the equipment is operated in this manner, the laterally directed jet 85 traverses many of the rows of plants 17, as the result of the capability of the nozzle passage 79 and orifice 71 of the invention to impart the hereinabove characteristics to the jet 85. Thus spray material is applied over a very wide swath during each passage of a spray rig incorporating an air sprayer having an air passage and discharge orifice designed in accordance with the hereinabove description. Therefore the distinctly contoured passage 79 and orifice 71 of the invention enable an operator to efficiently spray many acres of plants per day.

While I have illustrated and described a particular embodiment of my present invention, it will be understood that various changes may be made in the details thereof without departing from the scope of the invention as defined in the appended claims.

Having thus described my invention, what I claim as new and desire to protect by Letters Patent is:

1. In a spraying apparatus a nozzle, and means for creating and directing an air blast into said nozzle, said nozzle comprising a tubular transition member having therethrough a fluid passage of circular cross section at its inlet end for receiving said air blast and having at its outlet end a vertically elongated discharge orifice for discharging said air blast in a predetermined pattern, the top wall of the passage flaring upward at a predetermined angle with the horizontal toward the outlet end of said member to dispose the top edge of the orifice out of alignment with the top of the inlet end of the passage and for directing a major portion of said air blast above the center of said fluid passage, the bottom wall of the passage flaring downward at a greater angle with the horizontal toward the outlet end of said member to dispose the bottom edge of the discharge orifice more widely out of alignment with the bottom of the inlet end of the passage and for directing a lesser portion of said air blast below the center of the fluid passage, the side walls of the passage converging downward and toward the outlet end of the member to laterally restrict the discharge orifice increasingly toward the bottom edge of the orifice and in the direction of flow through the passage for causing said air blast to be discharged from said vertically elongated orifice at a higher velocity adjacent the top thereof than adjacent the bottom thereof.

2. In a spraying apparatus a nozzle, and means for creating and directing an air blast into said nozzle, said nozzle comprising a tubular transition member having therethrough a passage circular at its inlet end for receiving said air blast and terminating at its outlet end in a discharge orifice of vertically elongated cross section having straight sides and arcuate upper and lower ends for discharging said air blast in a predetermined pattern, the curvature of the upper edge of the orifice being of larger radius than that of the curvature of the lower edge and the side edges of the orifice being inclined downward and inward to impart a downwardly tapering configuration to said orifice, the top wall of said passage being transversely concave and longitudinally flared to dispose the upper edge of the orifice out of line with the top of the inlet end of the passage and for directing a major portion of said air blast above the center of said inlet passage, the bottom wall of the passage being transversely concave and longitudinally flared at a wider angle with the horizontal than said top wall to dispose the lower edge of the orifice more widely out of line with the bottom of the inlet end of the passage and for directing a lesser portion of said air blast below the center of said inlet passage, the side walls of the passage being inclined toward each other in the direction away from the inlet end of the passage to restrict the passage increasingly in the direction of flow therethrough, said side walls being inclined toward each other and downward to restrict the passage increasingly in the direction of flow therethrough more severely in the lower regions of the passage than in the upper regions of the same and for causing said air blast to be discharged from said vertically elongated orifice at a higher velocity adjacent the top thereof than adjacent the bottom thereof.

3. Apparatus for distributing chemical material comprising an air duct, means for directing a blast of air through the duct, a nozzle projecting from the outlet end of the duct and flaring vertically from the duct to the outlet end of the nozzle with the bottom surface thereof flaring at a greater angle from the horizontal than the upper surface to define a vertically elongated discharge orifice, said nozzle having a horizontally tapering form to restrict the discharge orifice laterally and the horizontal taper of the nozzle being of increasing pitch from the top to the bottom of the nozzle to laterally restrict the discharge orifice increasingly toward the bottom of the orifice for discharging a greater volume and higher velocity of air from the top portion of said discharge orifice than from the bottom portion thereof, and means mounted adjacent said air duct in cooperative association therewith for introducing chemical material to the blast of air.

4. Apparatus for distributing agricultural chemicals, comprising an air duct, means for directing an air blast through the duct, a nozzle having therethrough a passage communicating with the duct and arranged to receive the air blast therefrom, said passage being round at its inlet end and having at its outlet end a restricting discharge orifice of vertically elongated cross section with its largest horizontal dimension smaller than the diameter of said round inlet, the lateral edges of said orifice being downwardly convergent to restrict flow of air through the orifice to an increasing degree toward the lower portion of the orifice, the bottom wall of the passage being downwardly inclined in the direction of flow through the passage to expand the passage downward and effect decrease in the velocity of air flowing through the region of the orifice intermediate the upper and lower edges of the orifice, the lower portion of the orifice being out of direct alignment with the inlet end of the passage to effect diminution of both velocity and volume of air flowing through the lower portion of the orifice, and means constructed and arranged to introduce chemical material to the air blast.

5. Spraying apparatus for distributing agricultural chemicals, comprising an air duct, means for directing an air blast through the duct, a nozzle having therethrough a passage communicating with the duct and arranged to receive the air blast therefrom, said passage being round at its inlet end and having at its outlet end a discharge orifice of vertically elongated cross section, the upper and lower edges of said cross section being arcuate, the curvature of said upper edge being about a longer radius than the radius of curvature of said lower edge, the lateral edges of said orifice being downwardly convergent to restrict flow of air through the orifice to an increasing degree toward the lower portion of the orifice, the bottom wall of the passage being downwardly inclined in the direction of flow through the passage to expand the passage downward and effect decrease in the velocity of air flowing through the region of the orifice intermediate the upper and lower portions of the orifice, the lower portion of the orifice being out of direct alignment with the inlet end of the passage to effect diminution of both velocity and volume of air flowing through the lower portion of the orifice, and means constructed and arranged to introduce chemical material to said air blast.

6. Apparatus for distributing chemical material comprising an air duct, means for directing a blast of air through the duct, a nozzle projecting from the outlet end of the duct and having a portion thereof flared away from said duct and side portions converging towards said flared portion and towards a point disposed from said duct to define an elongated restricting discharge orifice having tapered sides and with the small end thereof disposed adjacent the flared end of said nozzle, said discharge orifice having a maximum width between the side portions smaller than the lateral dimension of said duct and the point of maximum width being disposed in direct alignment with said air blast, said small end of the restricting discharge orifice being out of direct alignment with said air blast for receiving air only after it is expanded in said restricting nozzle and for effecting a progressive decrease in velocity and volume of air flow through said discharge orifice at points progressively closer to the small end of the orifice, and means constructed and arranged to introduce chemical material to the air blast.

7. Apparatus for distributing chemical material, comprising a fluid conducting duct, means for directing a blast of chemical-laden gas through said duct, and a nozzle projecting from the outlet end of said duct and having a portion thereon flared away from said duct and having side portions converging toward said flared portion and toward the outlet end of said nozzle to define an elongated restricting discharge orifice, said orifice having tapered sides with the small end thereof disposed adjacent the flared end of said nozzle, said discharge orifice having a maximum width between the side portions smaller than the lateral dimension of said duct and the point of maximum width of said orifice being disposed in direct alignment with said blast of gas, said small end of the restricting discharge orifice being out of direct alignment with said blast of gas for receiving the gas only after it is expanded in said restricting nozzle and for effecting a progressive decrease in velocity and volume of gas flow through said discharge orifice at points progressively closer to the small end of the orifice.

References Cited in the file of this patent

UNITED STATES PATENTS

| | | |
|---|---|---|
| 1,318,881 | Kelley | Oct. 14, 1919 |
| 2,434,404 | Goodwin | Jan. 13, 1948 |
| 2,587,240 | Spreng | Feb. 26, 1952 |
| 2,685,476 | Spreng | Aug. 3, 1954 |
| 2,736,605 | Spreng | Feb. 28, 1956 |